(12) United States Patent
Chang et al.

(10) Patent No.: US 7,043,589 B2
(45) Date of Patent: May 9, 2006

(54) BUS SYSTEM AND BUS INTERFACE

(75) Inventors: Yeow Khai Chang, Singapore (SG); Zhenyu Zhang, San Jos, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 343 days.

(21) Appl. No.: 10/253,260

(22) Filed: Sep. 24, 2002

(65) Prior Publication Data
US 2003/0101298 A1  May 29, 2003

(30) Foreign Application Priority Data
Sep. 27, 2001  (WO) ............... PCT/SG01/00195

(51) Int. Cl.
  *G06F 13/14* (2006.01)
(52) U.S. Cl. .................... 710/305; 710/260
(58) Field of Classification Search ............. 710/305, 710/15–19, 46, 220, 260, 267
See application file for complete search history.

(56) References Cited

U.S. PATENT DOCUMENTS

| | | | | |
|---|---|---|---|---|
| 4,638,428 A | * | 1/1987 | Gemma et al. .............. 710/241 |
| 5,249,269 A | * | 9/1993 | Nakao et al. ................ 709/225 |
| 5,586,056 A | * | 12/1996 | Watanabe ............... 340/825.52 |
| 5,655,142 A | * | 8/1997 | Gephardt et al. ............. 712/32 |
| 5,675,807 A | * | 10/1997 | Iswandhi et al. ........... 710/260 |
| 5,857,094 A | * | 1/1999 | Nemirovsky ................. 703/28 |
| 5,903,912 A | * | 5/1999 | Hansen ....................... 711/154 |
| 5,948,097 A | * | 9/1999 | Glew et al. ................. 712/220 |
| 6,038,629 A | * | 3/2000 | Ogilvie et al. .............. 710/312 |
| 6,058,440 A | * | 5/2000 | Bloch et al. .................. 710/60 |
| 6,145,045 A | | 11/2000 | Falik et al. ................. 710/129 |
| 6,449,663 B1 | * | 9/2002 | Carney et al. ................ 710/15 |
| 6,640,268 B1 | * | 10/2003 | Kumar ........................ 710/46 |
| 6,665,807 B1 | * | 12/2003 | Kondo et al. ............... 713/400 |
| 6,691,190 B1 | * | 2/2004 | Burroughs et al. ......... 710/100 |
| 6,742,076 B1 | * | 5/2004 | Wang et al. ................ 710/314 |
| 6,751,724 B1 | * | 6/2004 | Scott et al. ................. 712/205 |

OTHER PUBLICATIONS

Anonymous: "Universal Host controller Interface (UHCI) Design Guide" Online! Mar. 1996, Intel Corp. XP002225237, pp. 1-41.

* cited by examiner

*Primary Examiner*—Rehana Perveen
*Assistant Examiner*—Trisha Vu
(74) *Attorney, Agent, or Firm*—Peter Zawilski

(57) ABSTRACT

The invention relates to a bus system comprising a first station and a second station coupled by a bus for transferring data and control signals. The bus is conceived to operate according to a protocol in which the first station repeatedly sends requests to said second station and the second station responds to the requests. The first station comprises an interruptible processor and a bus interface. The bus interface is operable to interrupt the interruptible processor upon reception of selected responses of the second station. The interruptible processor is operable to handle the interrupts of the bus interface.

12 Claims, 6 Drawing Sheets

BUS SYSTEM AND BUS INTERFACE

The invention relates to a bus system comprising a first station and a second station coupled by a bus for transferring data and control signals, said bus operating according to a protocol in which said first station repeatedly sends requests to said second station and said second station responds to said requests.

The invention also relates to a bus interface comprising a connection for a bus and an interrupt output for applying an interrupt to an interruptible processor.

Such a bus system is disclosed in the USB specification. The USB specification is a standard promulgated by a group of companies including Compaq Computer Corporation, Hewlett-Packard Company, Intel Corporation, Lucent Technologies Inc, Microsoft Corporation, NEC Corporation, and Koninklijke Philips Electronics N.V. Described below are various aspects of the USB relevant to a complete understanding of the present invention. Further background concerning the USB may be obtained from USB Specification, Revision 2.0, which is included herein by reference.

The USB is a standard bus designed to support data exchange between a personal computer and a wide variety of peripherals such as webcams, printers, scanners, microphones and keyboards. The USB thus replaces existing interfaces such as the RS-232C serial ports, parallel ports, and PS/2 interfaces. Further developments of the USB, for example, as in USB On-The-Go, aim at bus systems where another apparatus replaces the personal computer. Such an apparatus could be, for example, a digital still camera, a video camera, a personal digital assistant, or a cellular phone.

In a bus system like a USB system, electronic bus stations are connected to one another via a bus. Usually a bus station comprises a processor or computing system to process or generate data and to control the flow of data. USB stations are defined as hosts (e.g. personal computers) and as devices (peripherals). In general there is only one host on any USB system. A USB interface at the host is also referred to as a host controller. The host controller may be implemented in a combination of hardware, firmware, or software. USB devices are defined as hubs which provide additional attachment points or functions which provide capabilities to the system. The devices are connected to the host via a tiered-star topology. Hubs indicate the attachment or removal of a USB device. The host determines if a newly attached USB device is a hub or a function and assigns a unique USB address to the USB device. All USB devices are accessed by a unique USB address. Each device additionally supports one or more endpoints with which the host may communicate. The following description will be limited to USB devices defined as functions.

The USB is a polled bus. The host controller initiates all data transfers. Most bus transactions involve the transmission of up to three packets. Each transaction begins when the host controller, on a scheduled basis, sends a USB packet describing the type and direction of the transaction, the USB device address, and endpoint number. This packet is referred to as the "token packet". The USB device that is addressed selects itself by decoding the appropriate address fields. In a given transaction, data is transferred either from the host to a device or from a device to the host. The direction of data transfer is specified in the token packet. The source of the transaction then sends a data packet or indicates it has no data to transfer. The destination, in general, responds with a handshake packet indicating whether the transfer was successful.

The USB architecture comprehends three basic types of data transfer: (1) isochronous transfers: periodic, continuous communication between host and device, typically used for time-relevant information, which occupies a pre-negotiated amount of USB bandwidth with a pre-negotiated latency; (2) interrupt transfers: low-frequency, bounded latency communication, typically used for asynchronous data such as characters or coordinates with human perceptible echo or feedback response characteristics, and; (3) bulk transfers: non-periodic, large-packet bursty communication, typically used for data that can use any available bandwidth and can also be delayed until bandwidth is available.

Usually both types of bus station, host and device, comprise a processor or computing system to either process or generate data or to control the flow of data or both. A straightforward implementation of a USB system as described above could lead to a significant overhead for both the processor in the bus station acting as a host and the processor in the bus station acting as a device. This holds especially for the interrupt transfers. Due to the polled nature of the bus system, the host needs to interrogate the involved device, for instance a keyboard, on a regular basis and to evaluate the returned responses.

It is inter alia an object of the invention to reduce the amount of overhead needed to transport data from a processor in a first station of a bus system to a second station of the bus system or vice versa.

To this end the invention provides a bus system as defined in the opening paragraph which is characterized in that said first station comprises an interruptible processor and a bus interface, where said bus interface is operable for interrupting said interruptible processor upon reception of selected responses of said second station, and said interruptible processor is operable to handle the interrupts of said bus interface.

In operation the processor within the first station needs to provide information to the second station or needs to obtain information from the second station. To this end, the first station needs to communicate with the second station. In a polled bus system, such as a USB system, the communication is initiated by the first station, being a host in a USB system. If the second station, being a device in a USB system, is only capable of receiving or providing data on an irregular basis, it happens frequently that the first station needs to poll the second station quite a number of times before a successful transfer of information takes place. In other words, under these circumstances the first station needs to evaluate the responses of the second station relatively often before a successful transfer of information takes place.

On the other hand, it is not necessary to interrupt said processor if no further action is required. Thus, it is not necessary to report back the result of the communication with the second station if either the communication is completed as expected or if no new information, no data items, are provided by the second station. For example, in a USB system the second station may respond by sending a message with a data item acknowledge signal, a negative acknowledge signal, by sending a signal to indicate it is stalled. Furthermore, if the second station does not respond by sending a signal, or if no signal is received by the first station due to an error in the communication between the first station and the second station, this may be interpreted as a response too. Thus, the selected responses may comprise the absence of a response signal from the second station. Communication overhead of the processor is thus reduced if the processor is only interrupted upon reception of the responses that require farther action by the processor. To this end, the bus interface selects those responses from among the responses received. Programmed to handle such situations, the processor can decide upon necessary further actions.

A bus interface interface according to the invention comprises a connection for a bus and an interrupt output for applying an interrupt to an interruptible processor and is characterized in that it also comprises a controller operable to receive responses from said connection and to interrupt said processor upon reception of selected responses by sending an interrupt signal to the interrupt output.

These and other aspects of the invention will be apparent from and elucidated with reference to the embodiments described hereinafter.

In these figures identical parts are denoted by identical references.

Figure 1:
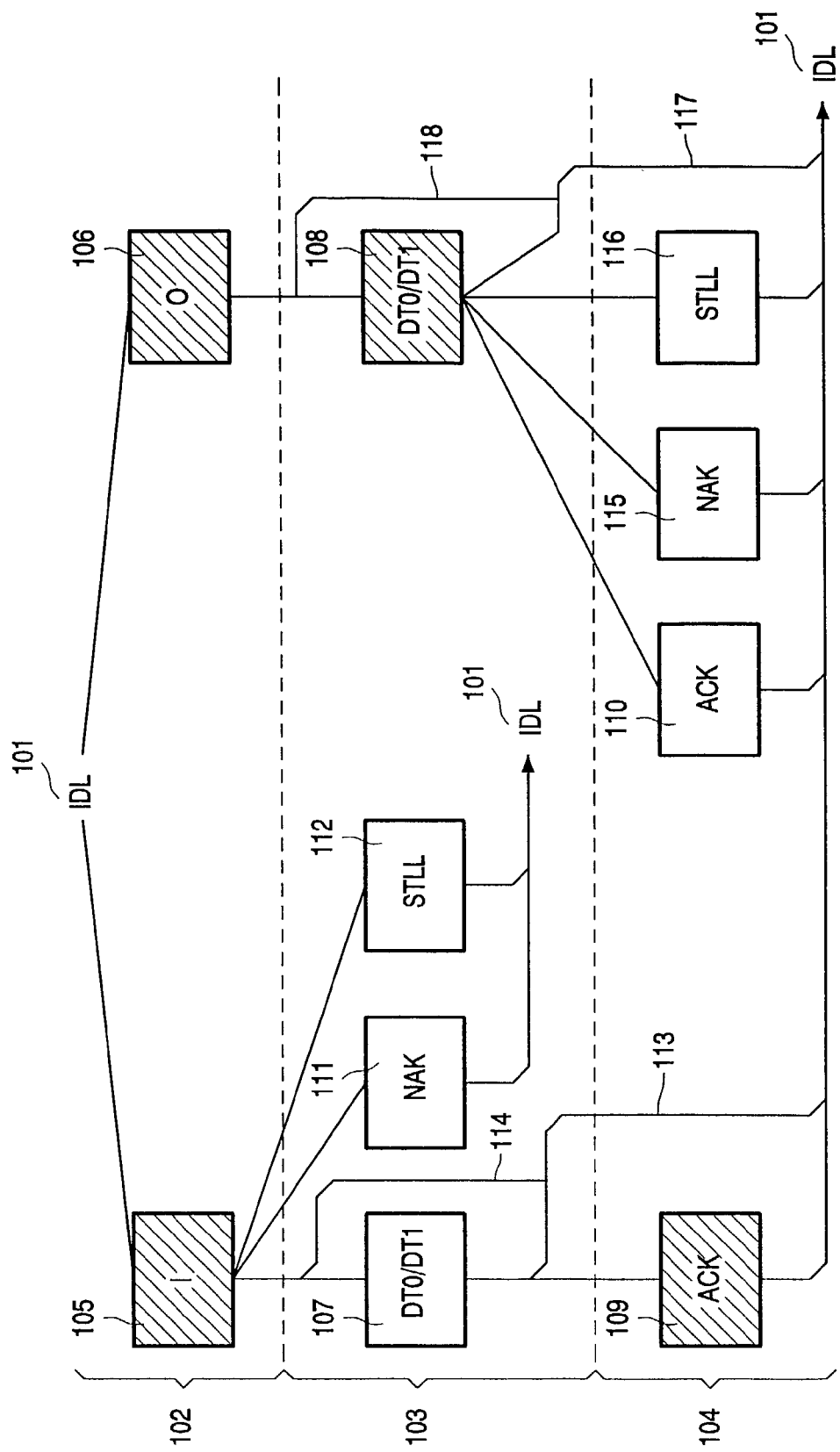
FIG. 1 is a diagram showing the interrupt transaction format as specified in the USB specification, revision 2.0.

FIG. 1 is a diagram showing the interrupt transaction format as specified in the USB specification, revision 2.0. Within USB all communication is initiated by the host. All USB devices are accessed by a unique USB address. Each device additionally supports one or more endpoints with which the host may communicate.

The USB supports functional data and control exchange between the USB host and USB devices. USB data transfers take place between host software and a particular endpoint on a USB device. The USB architecture comprehends three basic types of transfer:

isochronous transfers: isochronous or streaming real time data which occupies a prenegotiated amount of USB bandwidth with a pre-negotiated latency;

interrupt transfers: asynchronous interactive data such as characters or coordinates with human perceptible echo or feedback response characteristics, and bulk transfers: asynchronous block transfer data which is generated or consumed in relatively large and bursty quantities and has wide dynamic latitude and transmission constraints.

If there are no on-going transactions, a USB system is in an Idle mode 101. Bus transactions including data transfers, generally involve three stages: a Setup stage 102, a Data stage 103, and a Status stage 104.

Bus transactions including data transfers generally involve the transmission of three different packets, e.g. a Token packet 105, 106, a Data packet 107, 108, and a Handshake packet 109, 110, 111, 112, 115, 116.

Interrupt transactions may consist of IN transfers or OUT transfers. In the case of an IN transfer the USB host will start the transaction by sending an IN token 105. Upon receipt of the IN token, a USB device may return data 107, a negative acknowledge signal (NAK) 111, or a signal indicating the USB device is unable to complete a command (STALL) 112. If the endpoint has no new interrupt information to return (i.e. no interrupt is pending), the USB device returns a NAK handshake 111 during the Data stage 103. If the USB device is unable to complete a command, the USB device returns a STALL handshake 112. If an interrupt is pending the USB device returns the interrupt information as a Data packet 107. The USB host in response to receipt of the Data packet 107 issues either an ACK handshake 109 (acknowledge signal) if the data was received error-free or returns no handshake, indicated by line 113, if the Data packet 107 was received corrupted. Furthermore the USB host will not issue an ACK 109 in case no response to the IN token 105 is received at all from the USB device. This situation is indicated by line 114. After completion of the IN transfer, the USB system returns to the Idle mode 101.

In the case of an OUT transfer the USB host will start the transaction by sending an OUT token 106. This is followed by sending a Data packet 108. Upon receipt of the Data packet 108, the USB device may issue in the Status stage 104 an ACK handshake 110 if the data was received error free, a NAK handshake 115 indicating the device is not able to process the data, or a STALL handshake 116 indicating the USB device is currently stalled. The USB device returns no handshake, indicated by line 117, if the Data packet 107 was received corrupted. Furthermore the USB device will not issue an ACK handshake 110 in case it does not receive data from the USB host, a situation indicated by line 118. After completion of the OUT transfer the USB system returns to the Idle mode 101.

All packets begin with a SYNC field, which is used by input circuitry to align incoming data with a local clock. A packet identifier (PID) immediately follows the SYNC field of every USB packet. The PID consists of a four-bit ID field followed by a four-bit check field. The PID indicates the type of packet (e.g. Token 105, 106, Data 107, 108, and Handshake 109, 110, 111, 112, 115, 116) and the format of the packet along with the type of variant detection applied to the packet. The four-bit check field of the PID ensures reliable decoding.

A Token packet 105, 106 includes an ADDR field which specifies the target USB device, via its USB address, that is the source or destination of a Data packet 107, 108, depending on the value of the Token PID. USB devices must perform a complete decoding of the ADDR field.

A Data packet 107, 108 includes a data field which may range from zero to N bytes and must amount to integral numbers of bytes. Data bits within each byte are shifted out most significant bit first. The data field of a Data packet is divided into fields which give extra information to the USB device regarding the request being made. One field, the command code, tells what the targeted USB device should do, such as set up a read from a USB device space or set up a write to a USB device space. The read space command is used to request information from a given location in a given space of a USB device. The command is used to set up the read, which is followed by a request from the host for the USB device to send data. The USB device then sends the data it has retrieved from the previously specified space. The write space uses exactly the same definition as the read space. However, the Data packet contains data transferred by the host to the USB device.

A Handshake packet 109, 110, 111, 112, 115, 116 consists of only a PID. As indicated above Handshake packets are used to report the status of a data transfer and can return values indicating successful reception of data, CRC failure, flow control, and certain fault conditions.

Figure 2:
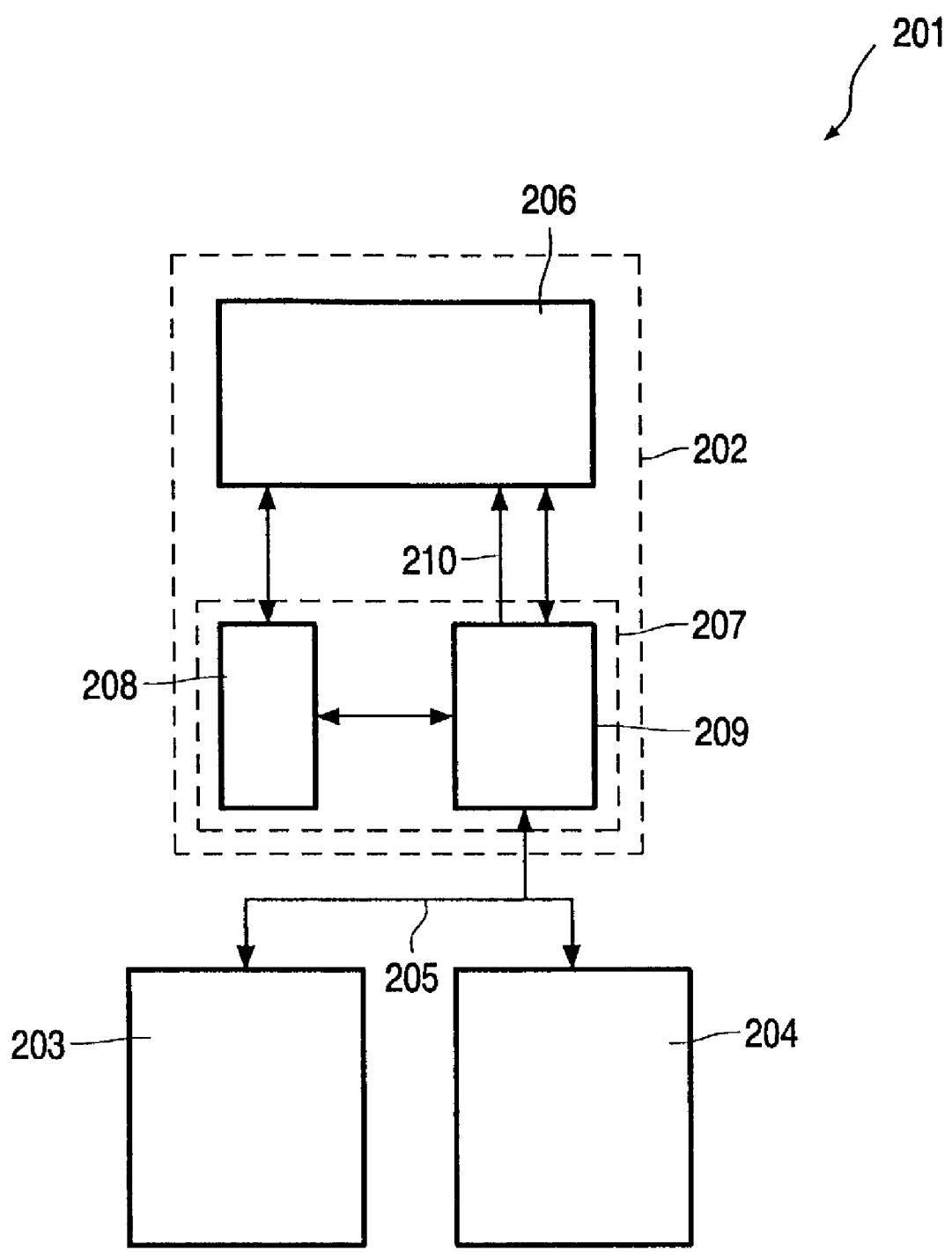
FIG. 2 is a block diagram showing a bus system according to the invention.

FIG. 2 is a block diagram showing a bus system according to the invention. The bus system 201 comprises a first station 202, acting as a USB host, and second stations 203 and 204, acting as USB devices. The stations 202, 203, 204 are coupled by bus connections 205. The first station 202 is shown in more detail. It comprises an interruptible processor 206 and a bus interface 207. The bus interface comprises a buffer 208 and a controller 209. It is not necessary that the buffer is part of the bus interface. In an alternative arrangement the buffer could be placed within the first station 202, but outside the bus interface. Both the processor 206 and the controller 209 have access to the buffer 208. The controller is coupled to the bus connections 205. Furthermore, the controller 209 has an interrupt connection 210 to the processor 206.

Figure 3A:
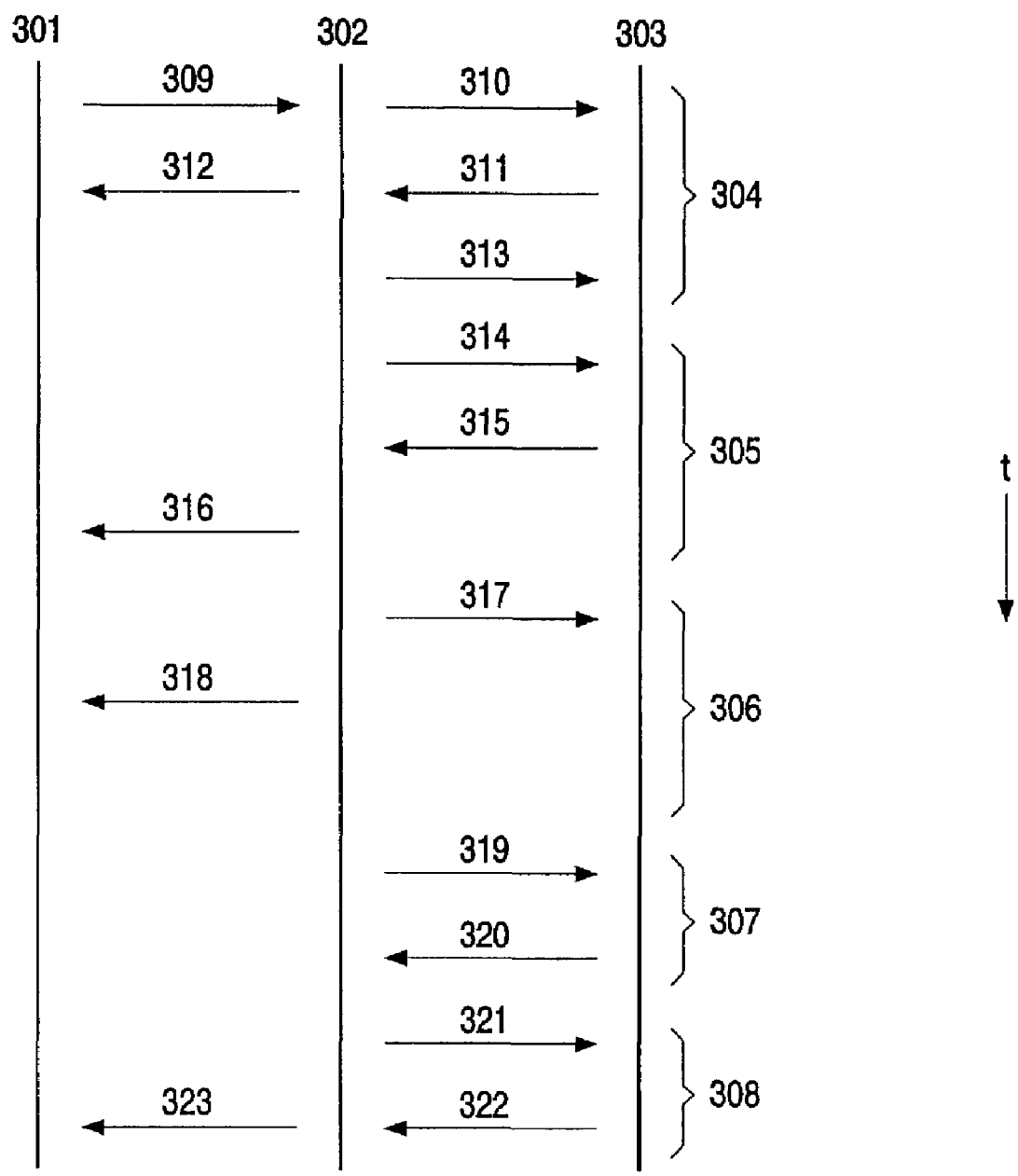
FIG. 3A is a message diagram showing transactions for data transmission.

FIG. 3A is a message diagram showing transactions for data transmission. The message diagram illustrates the operation of the system of FIG. 1 for interrupt transactions consisting of IN transfers. Going top-down the time increases. Information exchange between the processor 206 and the bus interface 207 is symbolized by arrows between a first line 301 and a second line 302. Information exchange between the bus interface and the second station 203, 204 is symbolized by arrows between the second line 302 and a third line 303.

The processor 206 requires data from one of the second stations 203, 204, a USB device. Thus the bus interface 207 should repeatedly issue a request for data to the bus connections 205. To reduce the communication overhead for the processor it should be sufficient to have the processor provide the request properties only once. If the addressed USB device returns data, the bus interface 207 should interrupt the processor via the interrupt connection and provide the processor with the data. In case an error occurs the processor should also be notified. In these situations the bus interface 207 should apply an interrupt to the processor too. In other situations no action is required from the processor, so that the bus interface 207 should not interrupt the processor.

In an IN transfer 304 the processor 206 in a message 309 sends the request properties to the bus interface 207, where the request properties are stored in the buffer. Based on the request properties within the message 309, which are retrieved from the buffer, the bus interface 207 initiates the IN transfer by issuing an IN token 310 on the bus. The second station, the addressed USB device, responds by sending a message 311 with a data item. Upon reception of this message the bus interface 207 sends an interrupt signal 312, via the interrupt connection 210, to the processor 206 to inform the processor 206 that new data is available. Furthermore, it issues an Acknowledge signal 313 to the addressed USB device. This completes the IN transfer 304.

In an IN transfer 305, following the IN transfer 304 with identical request properties, the bus interface 207 again retrieves the request properties from the buffer, while no new information is required from the processor 206. The bus interface 207 initiates the IN transfer by issuing an IN token 314 on the bus. The addressed USB device responds by sending a message 315 with a data item. Due to an error on the bus the second message 315 is received corrupted by the bus interface 207. Therefore, the bus interface 207 does not issue an ACK handshake. Instead it sends an interrupt signal 316 via the interrupt connection 210 to the processor 206 to inform the processor 206 an error occurred. This completes the IN transfer 305.

In an IN transfer 306, following the IN transfer 304 with identical request properties, the bus interface 207 again retrieves the request properties from the buffer 208, while no new information is required from the processor 206. The bus interface 207 initiates the IN transfer by issuing an IN token 317 on the bus. Due to a bus error the IN token 317 is received corrupted at the addressed USB device. For this reason it does not respond to the IN token 317. As no response follows by the USB device, the bus interface 207 sends an interrupt signal 318, via the interrupt connection 210, to the processor 206 to inform the processor 206 an error occurred. This completes the IN transfer 306.

In an IN transfer 307, following the IN transfer 304 with identical request properties, the bus interface 207 again retrieves the request properties from the buffer 208, while no new information is required from the processor 206. The bus interface 207 initiates the IN transfer by issuing an IN token 319 on the bus. The addressed USB device responds with a NAK handshake 320, indicating it has no data available. This completes the IN transfer 307.

In an IN transfer 308, following the IN transfer 304 with identical request properties, the bus interface 207 again retrieves the request properties from the buffer 208, while no new information is required from the processor 206. The bus interface 207 initiates the IN transfer by issuing an IN token 321 on the bus. The addressed USB device responds with a STALL handshake 322, indicating it cannot complete the command. Upon receiving the STALL handshake 322, the bus interface 207 sends an interrupt signal 323 via the interrupt connection 210 to the processor 206. This completes the IN transfer 308.

It will be clear that the IN transfers 304, 305, 306, 307 and 308 are just illustrative examples to clarify the functioning of the bus system and that the functioning of the bus system is limited neither to the IN transfers shown nor to the order in which the IN transfers are shown.

Figure 3B:
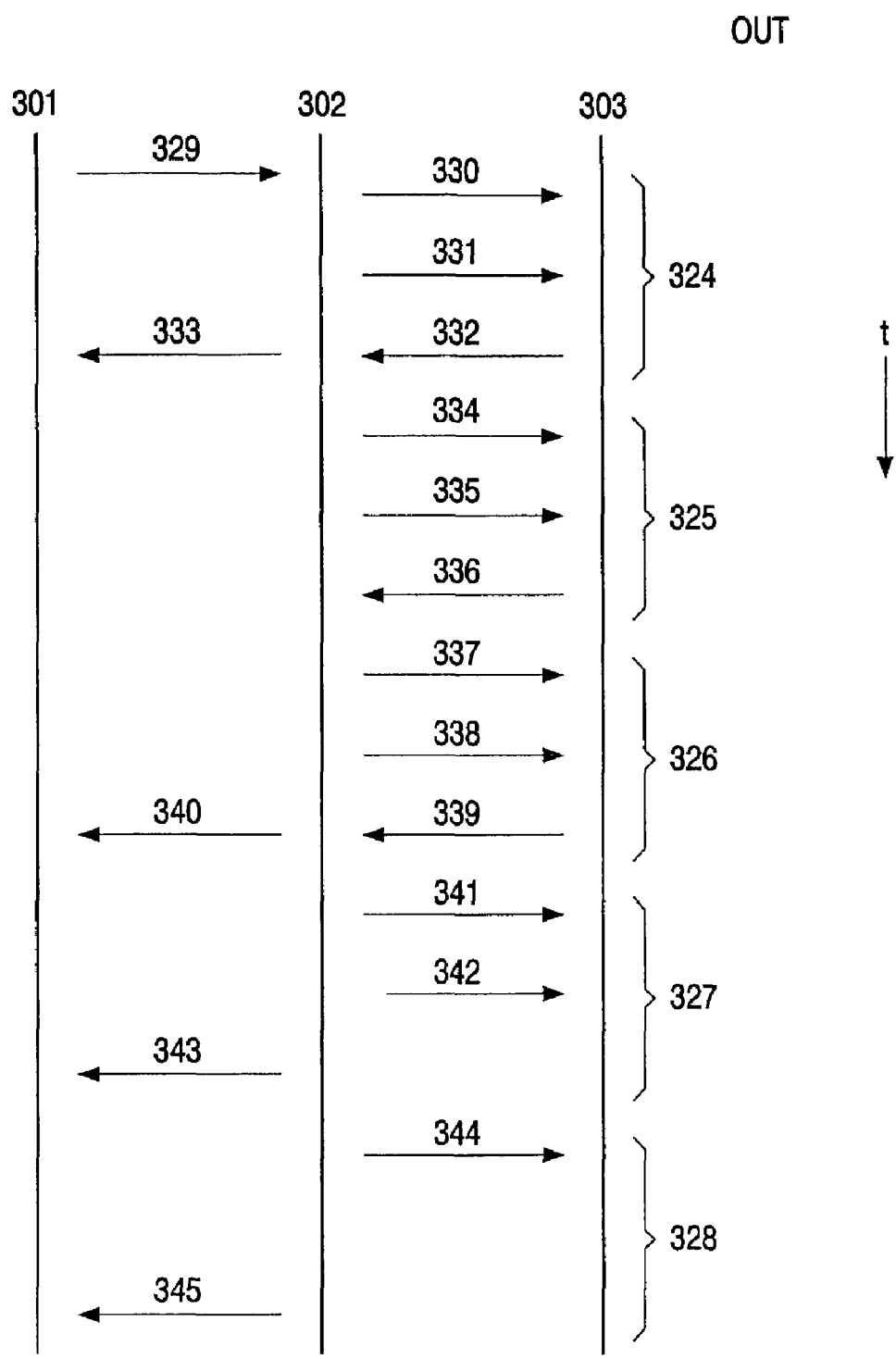
FIG. 3B is a message diagram showing transactions for data transmission.

FIG. 3B is a message diagram showing transactions for data transmission. The message diagram illustrates the operation of the system of FIG. 1 for interrupt transactions consisting of OUT transfers. Going top-down the time increases. Information exchange between the processor 206 and the bus interface 207 is symbolized by arrows between a first line 301 and a second line 302. Information exchange between the bus interface and the second station 203, 204 is symbolized by arrows between the second line 302 and a third line 303.

The processor 206 needs to transfer data to one of the second stations 203, 204, a USB device. Thus the bus interface 207 should repeatedly issue a request to transfer data to the bus connections 205. To reduce the communication overhead for the processor 206 it should be sufficient to have the processor 206 provide the request properties only once. If the addressed USB device accepts data the bus interface 207 should interrupt the processor via the interrupt connection and inform the processor. In case an error occurs the processor 206 should also be notified. In these situations the bus interface 207 should apply an interrupt to the processor 206 too. In other situations no action is required from the processor 206, so that the bus interface 207 should not interrupt the processor 206.

In a OUT transfer 324 the processor in a message 329 sends the request properties to the bus interface 207, where the request properties are stored in the buffer. Based on the request properties within the message 329, which are retrieved from the buffer, the bus interface 207 initiates the OUT transfer by issuing an OUT token 330 on the bus. Subsequently, the bus interface issues a Data packet 331. The second station, the addressed USB device, responds by sending an ACK handshake 332. Upon reception of the ACK handshake 332, the bus interface 207 sends an interrupt signal 333, via the interrupt connection 210, to the processor 206 to inform the processor 206 that the data is transferred successfully. In a different arrangement the bus interface 207 does not send the interrupt signal 332 to the processor 206, since the processor 206 will assume that a successful transmission of the data has occurred if it is not interrupted.

In an OUT transfer 325, following the OUT transfer 324 with identical request properties, the bus interface 207 again retrieves the request properties from the buffer 208, while no new information is required from the processor 206. The bus interface 207 initiates the OUT transfer by issuing an OUT token 334 on the bus. Subsequently, the bus interface issues a Data packet 335. The addressed USB device responds by issuing a NAK handshake 336 to indicate it is not ready to process the transferred data. This completes the OUT transfer 325.

In an OUT transfer 326, following the OUT transfer 324 with identical request properties, the bus interface 207 again retrieves the request properties from the buffer 208, while no new information is required from the processor 206. The bus interface 207 initiates the OUT transfer by issuing an OUT token 337 on the bus. Subsequently, the bus interface issues a Data packet 338. In response the USB device sends a STALL handshake 339 to indicate it cannot process the OUT transfer. In receipt of the STALL handshake the bus interface sends an interrupt signal 340 via the interrupt connection, to the processor 206 to inform the processor on the status of the addressed USB device. This completes the OUT transfer 326.

In an OUT transfer 327, following the IN transfer 324 with identical request properties, the bus interface 207 again retrieves the request properties from the buffer 208, while no new information is required from the processor 206. The bus interface 207 initiates the OUT transfer by issuing an OUT token 341 on the bus. Subsequently, the bus interface issues a Data packet 342. Due to an error on the bus the Data packet 342 is received corrupted by the addressed USB device. For this reason the addressed USB device does not respond. As no response follows by the USB device, the bus interface 207 sends an interrupt signal 343 via the interrupt connection 210, to the processor 206 so as to notify the processor. This completes the OUT transfer 327.

In an OUT transfer 328, following the OUT transfer 324 with identical request properties, the bus interface 207 again retrieves the request properties from the buffer 208, while no new information is required from the processor 206. The bus interface 207 initiates the OUT transfer by issuing an OUT token 344 on the bus. Due to the occurrence of an error condition the bus interface does not start or complete an already started issuing of a subsequent Data packet. For this reason the bus interface 207 sends an interrupt signal 345 via the interrupt connection 210, to the processor 206 so as to notify the processor. This completes the OUT transfer 328.

It will be clear that the OUT transfers 324, 325, 326, 327 and 328 are just illustrative examples to clarify the functioning of the bus system and that the functioning of the bus system is limited neither to the OUT transfers shown nor to the order in which the OUT transfers are shown.

Figure 4:
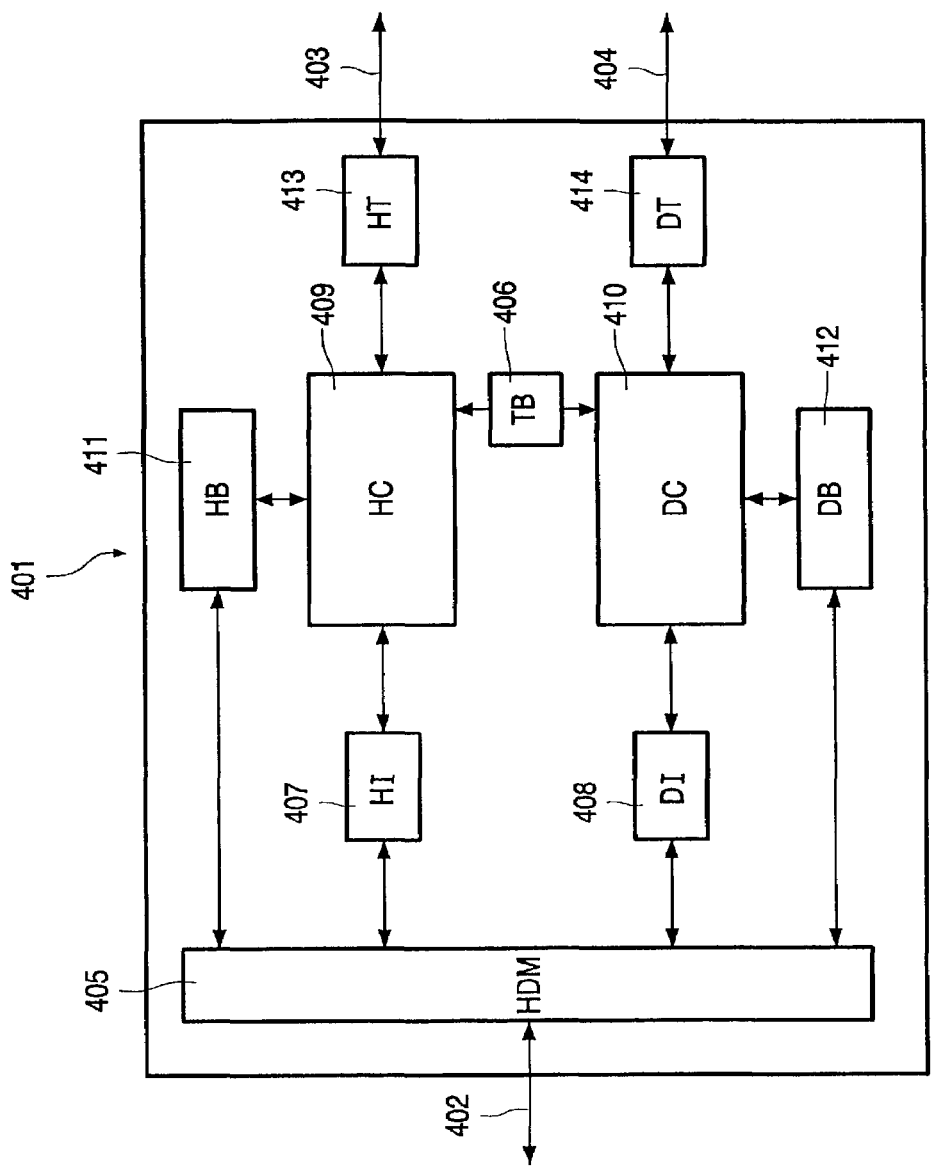
FIG. 4 is a block diagram showing a bus interface according to the invention.

FIG. 4 is a block diagram showing a bus interface according to the invention. The block diagram shown in the figure is a block diagram of a bus interface integrated circuit. The bus interface integrated circuit 401 has a dual role. It can be both part of a bus station acting as a USB device and of a bus station acting as a USB host. This is especially useful in a USB On-The-Go (OTG) apparatus. Such a USB OTG apparatus could be, for example, a digital still camera, a digital video camera, a personal digital assistant, or an oscilloscope, which in a certain mode of operation is connected, via USB, for example, to a mass storage apparatus (e.g. a hard disk drive, optical recorder, or solid state recorder), a printer, or a cellular phone. In this mode of operation the USB OTG apparatus should act as a USB host. In another mode of operation the USB OTG is connected, via USB, for example, to a personal computer. In this mode of operation the USB OTG apparatus should act as a USB device. The mode in which the bus interface integrated circuit of the USB OTG apparatus operates could be software determined and controlled by a processor within the USB OTG apparatus.

In case the USB OTG apparatus is portable it could be advantageous to include a low power consumption mode available in which the bus interface integrated circuits shuts down certain functional blocks or operates at a lower clock speed in time periods with, for example, low bus traffic or no bus traffic at all. Such a low power consumption mode could be enhanced by including a so-called remote wake-up feature, controlled by the processor of the USB OTG apparatus to bring back to operation certain or all functional blocks or to increase the clock speed of the bus interface integrated circuit. The remote wake-up feature could be activated, for example, if the processor anticipates increased bus traffic.

The bus interface integrated circuit 401 comprises a connection 402 with an processor, a connection 403 for connection to a USB in case the bus interface integrated circuit 401 operates as a USB host, and a connection 404 for connection to a USB in case the bus interface integrated circuit 401 operates as a USB device. Note that in a practical implementation connections 403 and 404 could share the same I/O terminals, while an internal multiplexer takes care of the internal routing of the bus signals. Such an implementation could be advantageous in case it is guaranteed that connections 403 are not used simultaneously.

The bus interface integrated circuit 401 also comprises a host-device multiplexer 405, a timing block 406, a host interface 407, a device interface 408, a host controller 409, a device controller 410, a host buffer 411, a device buffer 412, a host transceiver 413, and a device transceiver 414.

The host-device multiplexer 405 is connected to the connection 402 with the processor. Preferably under the control of the processor it determines the internal routing of the communication of the bus interface integrated circuit 401 with the processor. In case the bus interface integrated circuit 401 operates as a USB host, the host-device multiplexer 405 links the host controller 409, via the host interface 407, to the processor. In case the bus interface integrated circuit 401 operates as a USB device, the host-device multiplexer links the device controller 410, via the device interface 408, to the processor. The host controller 409 has access to the bus connection 403 via the host transceiver 413. The device controller 410 has access to the bus connection 404 via the device transceiver 414.

The host buffer 411 is accessible by both the host controller 409 and via the host-device multiplexer 405, by the processor. It can be used, for example, for storing request properties issued by the processor and for storing results of the communication between the host controller 411 and a USB device.

The device buffer 412 is accessible by both the device controller 410 and via the host-device multiplexer 405, by the processor. It can be used, for example, for buffering data generated by the processor, so as to be sent to a USB host.

To support co-operation between the bus interface integrated circuit and a wide range of processors, the host buffer 411 and the device buffer 412 are preferably accessible by the processor in both a direct memory access (DMA) mode and a parallel input-output mode.

It is advantageous to support several ways of communication between the processor and the buffers within the bus interface integrated circuit 401. This results in a wider choice of processors. For example, a more sophisticated computing system will support DMA operation. If the bus interface also supports DMA operation, the communication overhead of the processor is further reduced. On the other hand, in a less sophisticated bus station the processor handles all communication without the support of a DMA controller. In such a situation the bus interface needs to support the data exchange between the bus interface and the processor in a parallel input-output mode.

Although the embodiment discussed above relates to a bus interface integrated circuit, it will be clear to a person skilled in the art that different blocks or groups of blocks in the diagram could be embodied in different integrated circuits and discrete components. Thus, alternative embodiments relating to the bus interface described by the block diagram could comprise a plurality of integrated circuits and discrete components performing the functions of the various blocks.

Depending on the requirements of the bus system it is advantageous to realize the bus interface as an integrated circuit. The functional integration in an integrated circuit enables a reduction in component count and area minimization and hence will result in a reduction in physical size of a bus station comprising the bus interface. Furthermore, realizing the bus interface as an integrated circuit will allow for a reduction in power consumption.

Depending on the requirements of the bus system, it is advantageous to realize the bus interface with a plurality of integrated circuits and discrete electronic components, utilizing as much as possible standard building blocks. This reduces the cost price of the bus interface.

Figure 5:
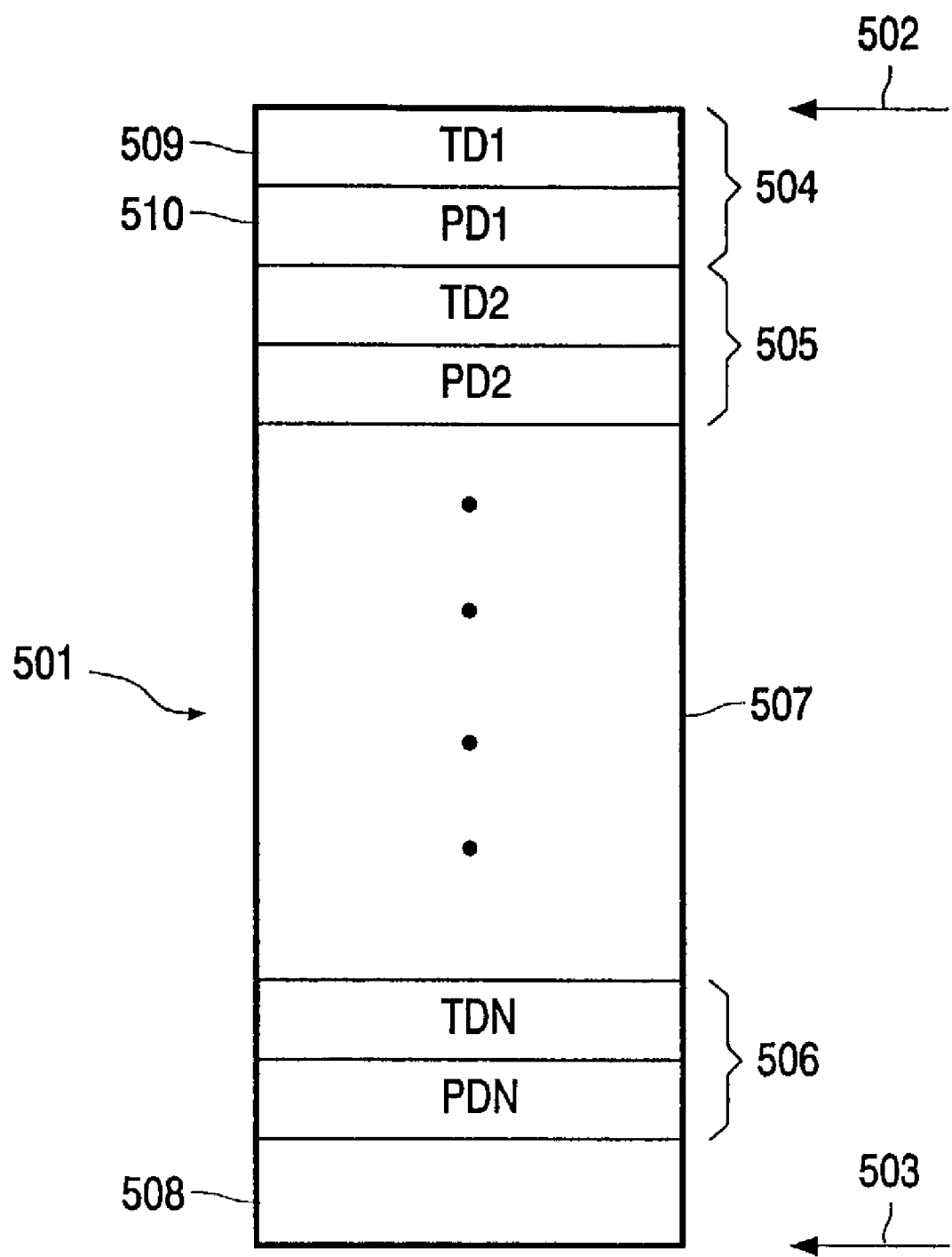
FIG. 5 is schematic overview of a buffer organized in a first-in, first-out manner.

FIG. 5 is schematic overview of a buffer 501 organized in a first-in, first-out (FIFO) manner. This in an efficient manner to organize the host buffer 411. The top of the FIFO buffer is indicated by an arrow 502. The bottom of the FIFO buffer is indicated by an arrow 503. The buffer stores request properties of several requests 504, 505, 506, for example, for initiating USB transactions or more in particular USB interrupt transactions. In the overview the request properties first issued are indicated by 504, the request properties issued second are indicated by 505, the request properties issued last are indicated by 506. The area 507 indicates the remaining request properties, while the area 508 indicates the remaining space in the FIFO buffer not being used. Request properties are divided in two parts: a transfer descriptor or header 509 and, if applicable, payload data 510. The transfer descriptor 509 describes the characteristics of the transaction to be handled by the host controller 409. The payload data 510 is the data that should be included in the Data packet of the transaction to be handled by the host controller. The transfer descriptor is also used by the host controller 409 to store the results of transactions. Therefore, both the processor and the host controller 409 have access to the FIFO buffer 501.

It is advantageous to arrange the buffer in a first-in first-out mode. In this way it is relatively simple to access the data stored in the buffer for both the processor as the controller.

It is advantageous to use the buffer to store both request properties and the results of the communication with the second station. By giving the processor read access to the buffer, or at least designated sections of the buffer, an efficient way of communication is established, since the same buffer is used to store the request properties and the results of the requests. Thus, the processor can access the buffer in an identical way as when it writes the request properties, only the type of access has to changed from a write mode to a read mode.

It is advantageous to have the bus interface determine the exact polling interval based on information provided by the processor. Limiting the number of possible polling rates simplifies the task of the bus interface in handling different requests with different polling rates. For example, if the processor may choose any polling rate between 1, 2, 3, and 128 milliseconds, the bus interface maps the chosen polling rate to one of the following actual polling rates: 1, 2, 4, 8, 16, 32, 64, or 128 milliseconds, thus reducing the potential number of different polling rates to handle from 128 to 8. Preferably, the bus interface maps the polling rate chosen by the processor on the actual polling rate that is closest to the chosen polling rate.

The table below shows a format of the transfer descriptor. The format shown consists of 8 bytes, indicated as Byte 0, Byte 1, . . . , Byte 7. Every byte consists of 8 bits, enumerated as 0, 1, . . . , 7.

|  | 7 | 6 | 5 | 4 | 3 | 2 | 1 | 0 |
|---|---|---|---|---|---|---|---|---|
| Byte 0 | Actual bytes (7:0) | | | | | | | |
| Byte 1 | Completion code | | | | Active | Toggle | Actual bytes (9:8) | |
| Byte 2 | MaxPktSize (7:0) | | | | | | | |
| Byte 3 | Endpoint number (3:0) | | | | Last | Speed | MaxPktSize (9:8) | |
| Byte 4 | Total bytes (7:0) | | | | | | | |
| Byte 5 | 0 | 0 | Res | Res | Dir. token (1:0) | | Total bytes (9:8) | |
| Byte 6 | 0 | Device address | | | | | | |
| Byte 7 | Interrupt polling interval (4:0) | | | | | | | |

The table below clarifies the meaning of the parameters in the table above.

| Name | Length (bits) | Description |
|---|---|---|
| ActualBytes | 10 | Contains the number of bytes that were transferred |
| Completion code | 4 | Indicates how the last transaction for the involved transfer descriptor was completed, including occurrence of errors |
| Active | 1 | Indicates whether or not transactions should be executed |
| Toggle | 1 | Used to generate or compare the data PID value. It is updated after each successful transmission or reception of a Data packet |
| MaxPktSize | 10 | Indicates the maximum number of bytes that can be sent to or received from the involved endpoint in a single Data packet |
| Res | 1 | not used |
| Speed | 1 | Indicates the speed of the involved endpoint |
| TotalBytes | 10 | Indicates the total number of bytes to be transferred |
| Dir. token | 2 | Indicates if the involved transfer descriptor involves IN transfers or OUT transfers |
| Device address | 7 | Indicates the address of the USB device that should be addressed |
| Interrupt polling interval | 4 | Indicates the polling interval of the interrupt transfers |

The invention claimed is:

1. A bus system comprising a first station and a second station coupled by a bus for transferring data and control signals, said bus operating according to a protocol in which said first station repeatedly sends requests to said second station and said second station responds to said requests by returning responses over the bus, the returned responses including an ACK response, a NAK response and an error response, said first station including an interruptible processor and a bus interface, said bus interface being operable for interrupting said interruptible processor in response to the ACK and error responses from said second station, but not interrupting said interruptible processor in response to the NAK response from said second station, and said interruptible processor is operable to handle the interrupts of said bus interface.

2. A bus system as claimed in claim 1, characterized in that said bus system is a USB bus system.

3. The bus system of claim 2, wherein the error response includes a stall response.

4. The bus system of claim 3, wherein the bus interface includes a host buffer for receiving the requests from the interruptible processor and the bus interface retrieves properties of the requests from the host buffer in a first-in first-out manner and sends the requests to the second station via the bus with no further information required from the interruptible processor.

5. The bus system of claim 4, wherein one of the requests is an IN transfer for polling for data from the second station, the host buffer receives the IN transfer from the interruptible processor and the bus interface retrieves the properties of the IN transfer from the host buffer in the first-in first-out manner and sends the IN transfer to the second station via the bus with no further information required from the interruptible processor, and the bus interface interrupts the interruptible processor in response to a corresponding one of the responses from the second station for the IN transfer unless the corresponding one of the responses is the NAK response.

6. The bus system of claim 5, wherein another one of the requests is an OUT transfer for sending data to the second station, the host buffer receives the OUT transfer from the interruptible processor and the bus interface retrieves the properties of the OUT transfer from the host buffer in the first-in first-out manner and sends the OUT transfer to the second station via the bus with no further information required from the interruptible processor, and the bus interface interrupts the interruptible processor in response to a corresponding one of the responses from the second station for the OUT transfer unless the corresponding one of the responses is the NAK response.

7. A bus interface comprising a connection for a bus and an interrupt output for applying an interrupt to an interruptible processor, characterized in that said bus interface also comprises a controller operable to receive responses including an ACK response, a NAK response and an error response, from said connection and interrupt said processor in response to the ACK and error responses by sending an interrupt signal to the interrupt output, but not interrupt said processor in response to the NAK response.

8. A bus interface for connection to a bus as claimed in claim 7, characterized in that said bus interface is arranged to operate as a USB interface.

9. The bus interface of claim 8, wherein the error response includes a stall response.

10. The bus interface of claim 9, wherein the bus interface further comprises a host buffer for receiving requests from the interruptible processor and the controller retrieves properties of the requests from the host buffer in a first-in first-out manner and transmits the requests to the connection with no further information required from the interruptible processor.

11. The bus interface of claim 10, wherein one of the requests is an IN transfer for polling for data from the connection, the host buffer receives the IN transfer from the interruptible processor and the controller retrieves the properties of the IN transfer from the host buffer in the first-in first-out manner and transmits the IN transfer to the connection with no further information required from the interruptible processor, and the controller sends an interrupt signal to the interrupt output in response to a corresponding one of the responses for the IN transfer unless the corresponding one of the responses is the NAK response.

12. The bus interface of claim 11, wherein another one of the requests is an OUT transfer for sending data to the connection, the host buffer receives the OUT transfer from the interruptible processor and the controller retrieves the properties of the OUT transfer from the host buffer in the first-in first-out manner and transmits the OUT transfer to the connection with no further information required from the interruptible processor, and the controller sends an interrupt signal to the interrupt output in response to a corresponding one of the responses for the OUT transfer unless the corresponding one of the responses is the NAK response.

* * * * *